INVENTOR
DOMINIC D'EUSTACHIO
BY
ATTORNEY

United States Patent Office 3,486,873
Patented Dec. 30, 1969

1

3,486,873
METHOD AND APPARATUS FOR REDUCING
THE THICKNESS OF FLOAT GLASS
Dominic D'Eustachio, Pittsburgh, Pa., assignor to Pittsburgh Corning Corporation, Pittsburgh, Pa., a corporation of Pennsylvania
Filed Feb. 16, 1967, Ser. No. 616,565
Int. Cl. C03b 18/00
U.S. Cl. 65—65                                    8 Claims

ABSTRACT OF THE DISCLOSURE

A glass sheet, while soft and floating on a molten metal bath, is subjected to a mechanical compressive force to reduce the thickness of the sheet and is then cooled sufficiently to retain its new dimension while still floating on the molten metal bath. The upper surface of the sheet is thereafter heated across its entire width sufficiently to flow and fire polish. During the reheating of the glass sheet upper surface, the sheet is floating on the molten metal bath so that the under surface remains smooth and polished by the molten metal. The apparatus for subjecting this sheet to a compressive force includes an adjustable graphite member mounted in the heating and leveling zone between the cooling zone in the tank. Radiant heaters are provided in the cooling zone to fire polish the upper surface of the sheet.

BACKGROUND OF THE INVENTION

Field of the invention

This invention relates to a method and apparatus for controlling the thickness of a glass sheet manufactured by floating the glass sheet on a molten liquid bath and more particularly to a method and apparatus for reducing the thickness of a glass sheet on a molten liquid bath by subjecting the sheet, while soft, to a mechanical compressive force and, thereafter, heat polishing the sheet.

Description of the prior art

When a layer of liquid is caused to float on any smooth, approximately level surface, the floating layer will attain an "equilibrium thickness" which, at a given ambient gas pressure, is determined by the density, viscosity and surface tension of the floating liquid. In the process of manufacturing flat glass by floating softened glass on a liquid bath, such as molten metal, the thickness of the sheet formed will be the "equilibrium thickness" and for commercial soda-lime glasses or similar compositions, this "equilibrium thickness" is approximately ¼". There is a need for glass sheets or flat glass of other thickness than the equilibrium thickness.

United States Patent 3,248,197 in the name of Michalik et al. and entitled "Method and Apparatus for Manufacture of Float Glass," is directed to one method for controlling the thickness of the glass sheet. The patent discloses a method for controlling air pressure over the glass sheet. This changes the equilibrium conditions and glass sheets of several thicknesses can be obtained for a given, commercially practical glass composition. Problems are encountered, however, in practicing the process described in Patent 3,248,197 because glass viscosity is an exponential function of temperature and small changes in temperature and ambient pressure have a substantial effect on the thickness of the glass sheet. Further, at the temperature required to practice the process, the close control of the pressure and tempertaure is difficult to attain. There is a need, therefore, for a process to control the thickness of the glass sheet that does not require control tolerances in temperature and pressure closer than normally achieved in commercial practice.

2

United States Patent 3,288,584 in the name of B. Long and entitled "Method of Making a Multicellular Vitreous Sheet on a Molten Metal Bath," is directed to a process for making a continuous ribbon of multicellular glass. During the cellulation process the upper surface of the ribbon of multicellular glass has an uneven configuration and Long employs a roller device to level the upper surface and immediately thereafter cool it to prevent further bloating which would again deform the surface.

SUMMARY OF THE INVENTION

Briefly, the herein disclosed invention is directed to a method and apparatus for controlling the thickness of a glass sheet that includes floating a sheet of glass on a molten liquid having a density greater than that of the glass. The glass sheet is heated to a temperature sufficient to soften the sheet enough for the glass to flow and accurately conform to the smooth surface of the molten bath. In this softened state the sheet acquires the equilibrium thickness. While in this softened state and floating on the molten liquid, this invention subjects the glass sheet to a mechanical compressive force to reduce the thickness of the sheet below the equilibrium thickness. The sheet is soon thereafter cooled at this reduced thickness to an extent that the sheet retains its shape. It should be clear that attaining of the equilibrium thickness by the floating softened sheet is a function of time and temperature because the softened glass is not a Newtonian liquid but has relatively high internal shear characteristics. It is therefore possible to temporarily deform the sheet from its equilibrium thickness and if the sheet is cooled soon enough thereafter it will retain the new thickness. Having the sheet in contact with a metal bath whose temperature is easily controlled and which bath is an excellent heat sink and by using a temperature controlled (for example the roll can be water cooled) means for deforming the upper surface the purpose of this invention, namely making the sheet thinner, is attained. At this reduced temperature, the upper surface of the sheet previously subjected to the mechanical compressive force, is fire polished to provide an upper and lower smooth surface for the sheet.

It should be noted that this invention is applicable to controlling the thickness of sheets which may not be at the normal equilibrium thickness. For example if in the process for making "float glass," side guides for the floating glass sheet similar to those disclosed in Long 3,288,584 are employed to prevent the glass from flowing out and by this means a sheet thicker than normally formed is attained, this thicker sheet can then be flattened and made to have a controlled thickness by applying a mechanical force to the upper surface at the appropriate time and thereafter cooling and fire polishing the upper surface, as disclosed in this invention.

Accordingly, the principal object of this invention is to provide an apparatus for mechanically controlling the thickness of a glass sheet while the sheet is floating on the surface of a molten metal bath.

Another object of this invention is to provide a method and apparatus for reducing the thickness of a glass sheet by subjecting the upper surface of the sheet to a compressive force while the sheet is floating on the surface of a molten metal bath.

The still further object of this invention is to provide a method and apparatus for reducing the thickness of a glass sheet by squeezing the sheet between a roller and the upper surface of a molten metal bath and thereafter polishing the upper surface of the sheet while the sheet is floating on a molten metal bath.

These and other objects and advantages of this invention will be more completely disclosed and described in

DESCRIPTION OF THE PREFERRED EMBODIMENTS

Figures 1, 2, 3, 4:
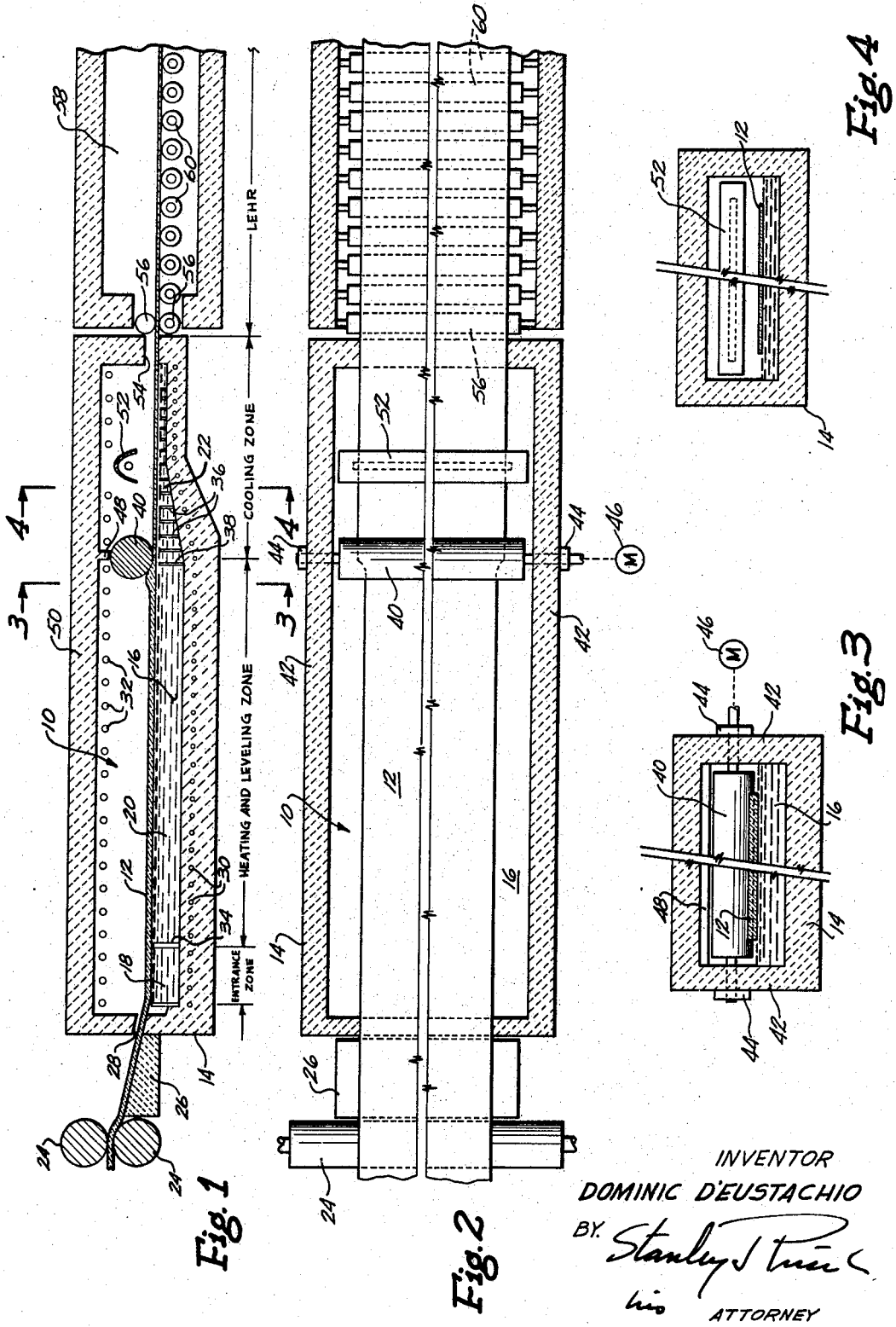
FIGURE 1 is a semi-diagrammatic vertical section illustrating the appaartus for the process for controlling the thickness of a continuous ribbon of glass supported on a molten metal bath.
FIGURE 2 is a top plan view of the apparatus illustrated in FIGURE 1 illustrating the lateral elongation of the continuous ribbon of glass by the roller device.
FIGURE 3 is a view in transverse section taken along the line 3—3 in FIGURE 1 illustrating the roller device in elevation.
FIGURE 4 is a view in transverse section taken along the line 4—4 in FIGURE 1 illustrating the heater device for polishing the upper surface of the continuous ribbon of glass after the thickness has been reduced below the equilibrium thickness.

Throughout the specification the terms flat glass, sheet of glass, and continuous ribbon of glass are used interchangeably to designate the mass of glass that is fed onto the surface of a molten metal bath for treatment thereon. The term equilibrium thickness is intended to designate the thickness that the floating sheet or ribbon of glass attains after it has softened on the surface of the molten metal bath in an unrestrained condition.

Referring to FIGURES 1 and 2 there is illustrated diagrammatically a chamber 10 in which the ribbon of glass 12 is treated. The chamber 10 includes a tank 14 that contains a molten metal bath 16. The tank 14 is constructed of a refractory material and is divided into three zones by vertical barriers. The first zone 18 being designated an entrance zone, the second zone 20 designated a heat and leveling zone and the third zone 22 designated a cooling zone.

The ribbon of glass 12 is supplied from a conventional glass melting furnace and passes between forming rolls 24 and is delivered onto support 26 and then passes through an opening 28 in chamber 10 onto the upper surface of the molten metal bath 16. Suitable heating means, such as electrodes 30, are provided in the refractory bottom of tank 14 to heat the molten metal bath 16 within the chamber 10. Other suitable means may be employed other than electrodes 30 to heat the molten metal bath. It is preferable, however, because of the temperature gradient in the molten metal bath that the heating means within the bath be so controlled either individually or in groups to provide the hereinafter discussed temperature gradient. Radiant heaters 32 are positioned in the chamber 10 above the upper surface of the molten metal bath 16 to maintain the desired temperature within the chamber 10.

There is a vertical barrier 34 extending upwardly from the base of the refractory tank 14 to separate the entrance zone 18 from the heating and leveling zone 20. A plurality of vertical baffles 36 extend upwardly from the base of the refractory tank 14 within the cooling zone 22 to permit the temperature gradient therein. The boundary between the heating and leveling zone 20 and cooling zone 22 is designated by the barrier 38.

Positioned above the upper surface of the molten metal bath 16 between the heating and leveling zone 20 and the cooling zone 22 is a roller 40 that is rotatably supported in the side walls 42 of the chamber 10, as is illustrated in FIGURE 3. The roller 40 is rotatably supported in journals 44 that permit vertical adjustment of the roller 40 relative to the upper surface of the molten metal bath 16. There is illustrated diagrammatically a motor 46 that may be utilized to rotate the roller 40, if desired. A vertical wall 48 divides the heating and leveling zone 20 from the cooling zone 22 and extends downwardly from the upper wall 50 of chamber 10.

Within the cooling zone 22 there is positioned a radiant heater 52 that is adjacent to the upper surface of the molten metal bath 16 and is arranged transversely or at right angles to the direction of movement of the ribbon of glass 12. It is desirable and well known to those versed in the art that the atmosphere in chamber 10 should be inert relative to the molten bath used to support the glass. For example if molten tin is used as the bath, dry nitrogen can be used as a suitable inert atmosphere. The dry nitrogen is introduced at any convenient point and maintained at a slight pressure above room ambience so air will not enter chamber 10. The chamber 10 has an outlet opening 54 for the ribbon of glass 12. Pinch rolls 56 engage the ribbon of glass adjacent the outlet opening 54 and, where necessary, assist in conveying the ribbon of glass 12 through the chamber 10. Adjacent the chamber 10 is a second chamber 58 which serves as a lehr designed to anneal the sheet in the conventional manner and has a plurality of rollers 60 that support the ribbon of glass again in the conventional manner.

OPERATION

The apparatus illustrated and described in FIGURES 1–4 controls the thickness of the ribbon of glass 12 in the following manner. The ribbon of glass 12 is fed by the pinch rolls 24 onto the support 26 through the opening 28 into the chamber 10 and is supported on the upper surface of the molten metal bath 16. The ribbon is fed by the pinch rolls 24 at a controlled rate onto the upper surface of the molten metal bath 16 and the ribbon of glass 12 has a thickness of about ¼″ or other suitable thickness and is at a temperature of about 1400° F. The ribbon of glass 12 is subjected in the entrance zone 18 to a temperature of about 1500° F. and to a temperature of about 1900° F. in the heating and leveling zone 20. The ribbon of glass 12 is fed into the chamber 10 at a controlled rate so that the ribbon of glass is heated and softened. The softening of the ribbon of glass within the heating and leveling zone 20 reduces the viscosity of the ribbon of glass so that the ribbon of glass attains an equilibrium thickness which for conventional soda-lime glass is about ¼″. If the glass is restrained by side guides partly immersed in the molten support bath, other thicknesses can be attained.

In order to reduce the thickness of the ribbon of glass below the equilibrium thickness to a thickness, for example of about ⅛″, the ribbon of glass passes beneath a roller 40 at a location adjacent the boundary between the zones 20 and 22 while floating on the upper surface of the molten metal bath. The roller 40 is adjusted so that it exerts a compressive force on the upper surface of the ribbon 12 and squeezes the ribbon of softened glass down onto the upper surface of the molten metal bath. The density of the molten metal bath is sufficient to support the ribbon of softened glass while the downward compressive force is exerted thereon by the roller 40. This compressive force of the roller 40 reduces the thickness of the ribbon of glass 12 to the desired thickness that is less than the aquilibrium thickness. Where desired, the motor 46 may be energized to rotate the roller 40 at a preselected speed either in the direction of movement of the glass or in the opposite direction, or the roller 40 may be permitted to rotate freely and rotate as a result of the movement of the ribbon of glass. The motor 48 is energized and the direction of rotation of the roller 40 by motor 46 is dependent on the conveying forces exerted by the pinch rolls 24 and 56 and on the type of glass being treated.

Since the ribbon of glass is at a reduced viscosity after being subjected to the elevated temperature within the heating and leveling zone 20, a relatively small compressive force is necessary to squeeze the ribbon of glass against the upper surface of the molten metal bath and reduce the ribbon of glass to the desired thickness. Although only a single roller 40 is illustrated in the diagrammatic drawings, it should be understood, where necessary, more than one roller may be utilized to exert the compressive force on the ribbon of glass. The rolls are preferably fabricated of graphite or other material that is not wetted by the molten glass so that the molten glass does not adhere thereto. Where necessary, the roller 40 may include cooling means that will prevent excess heat build up in the roller and will rigidify the upper surface of the ribbon of glass 12 as its thickness is reduced to the desired thickness. Where the roller 40 is driven in such a manner that the ribbon of glass is elongated longitudinally, or where side guides are employed to limit the width of the ribbon, the ribbon of glass at reduced thickness must move over the surface of the molten metal at a faster rate than does the ribbon before it is subjected to a compressive force by the roller. This is necessary in order that the mass of glass which moves along the molten metal surface per unit time be constant everywhere on the surface of the metal bath. This additional speed of the glass sheet can be obtained and controlled by pinch rolls or other suitable means located between the molten metal bath and the lehr. The ribbon of glass 12, after the thickness thereof has been reduced, immediately passes into the cooling zone 22. In the cooling zone 22 the temperature ranges from 1900° F. adjacent the heating and leveling zone 20 to a temperature of about 1000° F. adjacent the outlet 54. The viscosity of the ribbon of glass as it passes through the cooling zone increases at a controlled rate and sufficiently fast so that the ribbon of glass maintains substantially the same thickness as it attained after being subjected to the compressive force of the roller 40.

The roller 40 in contacting the upper surface of the ribbon of glass 12 destroys the smooth polished upper surface attained when the glass is heated to a temperature above its softening temperature by imprinting on the upper surface the minor irregularities that are on the surface of the roller. As is well know these minor irregularities which may be only a thousandth of an inch deep destroy the desired fire polished appearance of the glass. After the ribbon of glass has attained a temperature of about 1200° F. in the cooling zone 22, the upper surface of the ribbon of glass is subjected to an elevated temperature by the heater 52. The ribbon of glass 12 moves under the heater 52 at a controlled rate to heat the upper surface of the ribbon to a temperature of about 1800° F. The lower portion of the ribbon, however, remains substantially at the same temperature as the molten bath, i.e. about 1200° F. The upper surface of the ribbon of glass 12 is softened as it is heated by the heater 52 so that the glass on the upper surface flows and fills in the imperfections caused by the roller 40 and the upper surface of the ribbon is smooth and repolished. Only the upper surface need be heated because the imperfections are very shallow. The ribbon of glass, however, when the upper surface is subjected to the elevated temperature from the heater 52, is not heated throughout sufficiently to reduce the viscosity thereof and permit the thickness of the ribbon to change or return to the equilibrium thickness. The ribbon of glass 12 is thereafter cooled to about 1000° F. in the chamber 10 and conveyed therefrom into the lehr 58 where it is annealed and cooled.

Although the molten bath 16 is referred to as a molten metal bath it should be understood that any molten material such as molten salts, molten tin or alloys of tin that are not wetted by molten glass are suitable as a heat exchange media for the ribbon of glass.

EXAMPLE

A ribbon of glass of convenient width, for example 12 inches or more, having a composition, by weight, of 71.38 percent $SiO_2$, 13.26 percent $Na_2O + K_2O$, 11.76 percent CaO, 2.54 percent MgO, 0.75 percent $Na_2SO_4$, 0.15 percent $Al_2O_3$, 0.11 percent $Fe_2O_3$, and 0.06 percent NaCl, and a weight density of 2.542 grams per cubic centimeter is formed by a pair of rolls to a thickness of substantially 0.25 inch and delivered at 1400° F. and floated upon the surface of a molten bath of metal of 100 percent tin having a weight density of 6.52 grams per cubic centimeter at 1800° F. The tank of molten metal is of the construction illustrated in the drawing and is longitudinally divided into three sections, an entrance section, the metal of which is maintained at a temperature of 1500° F., a melting section, the metal of which is maintained at a temperature of 1900° F. and a cooling section in which the metal is at a temperature ranging from 1900° F. to 1000° F.

One or more water cooled graphite rolls is pressed against the upper surface of the glass just as it is leaving the 1900° F. zone and the sheet is here reduced in thickness from 0.25″ to 0.125″. At a position over the cooling portion of the bath where the glass is at approximately 1200° F., a narrow line of burners is placed at right angles to the direction of glass movement. The burners are so adjusted that the top surface of the glass sheet is heated to about 1800° F. while approximately the lower quarter (that is that portion in contact with the molten metal) of the sheet is held at the temperature of the molten metal that it contacts. This condition is attained by maintaining the molten metal that contacts the glass immediately under the burners, at about 1200° F. by suitable control of heat input to the molten metal. After cooling the entire repolished and properly dimensioned sheet to 1000° F., it is withdrawn from metal contact and transferred to an annealing and cooling oven at the reduced temperature.

According to the provisions of the patent statutes, I have explained the principle, preferred construction, and mode of operation of my invention and have illustrated and described what I now consider to represent its best embodiments.

I claim:
1. In a method of manufacturing flat glass of a desired thickness comprising,
   floating a continuous ribbon of glass on a molten liquid having a density greater than the density of said glass,
   heating said continuous ribbon of glass on said molten liquid until said continuous ribbon of glass on said molten liquid is softened and attains an equilibrium thickness,
   subjecting the upper surface of said continuous ribbon of glass on said molten liquid to a mechanical compressive force to reduce the thickness of said continuous ribbon of glass to a second thickness, said second thickness being less than said equilibrium thickness,
   thereafter casting said continuous ribbon of glass at said second thickness on said molten liquid to increase the viscosity of said continuous ribbon of glass and maintain said second thickness,
   the improvement comprising,
   thereafter subjecting the upper surface of said continuous ribbon glass at said second thickness across the entire width of said continuous ribbon to an elevated temperature above the softening temperature of said continuous ribbon of glass to provide a smooth, polished upper surface,
   thereafter cooling the entire repolished continuous ribbon of glass on said molten liquid sufficiently to be drawn into a lehr, and
   thereafter cooling at a controlled rate to achieve an annealed continuous ribbon of glass at room temperature.
2. In a method of manufacturing flat glass of a desired thickness as set forth in claim 1 wherein,
   said molten liquid on which said continuous ribbon of glass floats comprises a bath of molten tin.
3. In a method of manufacturing flat glass of a desired thickness as set forth in claim 1 in which, said equilibrium thickness of said continuous ribbon of glass is about ¼ inch and said second thickness is less than ¼ inch.

4. Apparatus for manufacturing flat glass of a desired thickness comprising, a tank containing a molten metal bath, means dividing said tank into a heating and leveling zone and a cooling zone, means for feeding a ribbon of glass into said tank and floating said ribbon of glass on the surface of said molten metal bath and conveying said ribbon of glass through said tank at a controlled rate, thickness reducing means positioned in said tank between said heating and leveling zone and said cooling zone for exerting a mechanical compressive force on said ribbon of glass to reduce the thickness of said ribbon, and surface heating means in said cooling zone to polish the upper surface of said ribbon of glass across the entire width of said ribbon of glass after the thickness of said ribbon of glass has been reduced.

5. Apparatus for manufacturing flat glass of a desired thickness as set forth in claim 4, in which, said thickness reducing means includes a roller positioned above the surface of said molten metal bath and transversely to the direction of movement of said ribbon of glass.

6. Apparatus for manufacturing flat glass of a desired thickness as set forth in claim 5 which includes, means for adjusting said roller movably toward and away from the surface of said molten metal bath to control the reduced thickness of said ribbon of glass.

7. Apparatus for manufacturing flat glass of a desired thickness as set forth in claim 4, in which, said surface heating means includes radiant heater means positioned in said cooling zone above the upper surface of said molten metal bath and arranged transversely to the direction of movement of said ribbon of glass.

8. Apparatus for manufacturing flat glass of a desired thickness as set forth in claim 4 which includes, means for increasing the speed of flow of said ribbon of glass after said ribbon has been subjected to said compressive force.

References Cited

UNITED STATES PATENTS

| | | | |
|---|---|---|---|
| 3,301,651 | 1/1967 | Long | 65—99 |
| 3,326,651 | 6/1967 | Javaux | 65—99 |

S. LEON BASHORE, Primary Examiner

E. R. FREEDMAN, Assistant Examiner

U.S. Cl. X.R.

65—91, 99, 182